July 9, 1929.  F. BRINK  1,720,464

VISE

Filed Nov. 23, 1928

Inventor
Frederick Brink
By Wooster & Davis
Attorneys

Patented July 9, 1929.

1,720,464

UNITED STATES PATENT OFFICE.

FREDERICK BRINK, OF STRATFORD, CONNECTICUT, ASSIGNOR TO THE BRINK AND COTTON MANUFACTURING COMPANY, OF BRIDGEPORT, CONNECTICUT, A CORPORATION OF CONNECTICUT.

VISE.

Application filed November 23, 1928. Serial No. 321,284.

This invention relates to an improvement in vises and has for an object to provide an improved construction to facilitate manufacture and assembly and give greater strength.

It is also an object of the invention to provide improved means for securing the adjusting screw in the movable jaw.

With the foregoing and other objects in view, the invention consists in certain novel features of construction, combinations and arrangements of parts as will be more fully disclosed in the accompanying drawing. In this drawing, Fig. 1 is a partial side elevation and a partial longitudinal section of a vise including my improved construction.

Figure 1:
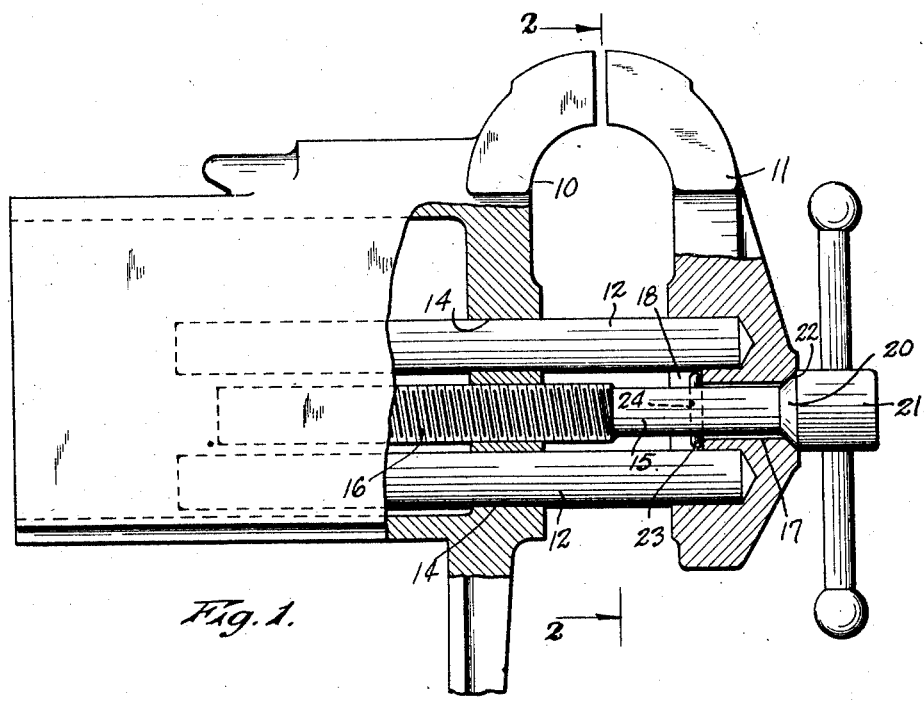
Figures 2, 3:
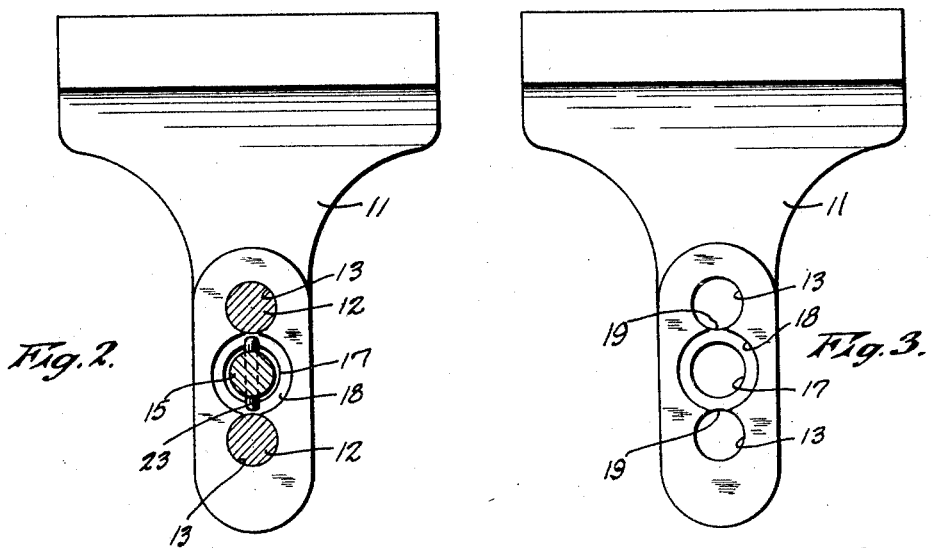
Fig. 2 is a transverse section substantially on line 2—2 of Fig. 1.
Fig. 3 is an elevation of the movable jaw looking toward the inner wall thereof and with the adjusting screw and guide rods removed.

The vise illustrated comprises the usual stationary jaw 10 and movable jaw 11, the stationary jaw including a body which is mounted on any suitable support by the usual clamping means not shown. The movable head or jaw is mounted on a pair of guide rods 12 secured at their outer ends to the jaw 11 by any suitable means, preferably by drilling holes 13 in the jaw and mounting the rods therein with a forced fit. These rods have sliding fit with openings 14 in the stationary jaw of the body.

The jaw 11 is adjustable relative to the stationary jaw by means of adjusting screw 15. This screw has a threaded portion 16 threaded into the stationary jaw and extends through an opening 17 in the movable jaw 11. This opening 17 is located between the openings for the guide rods 12 and is counterbored at its inner end, as shown at 18. This counterbore is of a diameter to overlap slightly at least one of the openings 13 for the guide rod and preferably overlaps both of them, although it is sufficient if it overlaps only one of them, so as to break through the walls of these openings, as indicated at 19, to form a communication between the openings and the counterbore for a purpose which will presently be described.

It is preferred that the thread 16 on the adjusting screw be formed by rolling in a die as this may be done at less cost than cutting the thread. This rolling operation raises the thread slightly, or that is makes it somewhat larger in diameter than the diameter of the stock from which it is rolled. It is, therefore, necessary that the opening 17 be of sufficient diameter to permit insertion of this threaded portion of the screw, and the opening is, therefore, of somewhat larger diameter than the neck 15 of the screw. To properly center this screw in the opening 17 the shoulder 20 on its head 21 is tapered at a suitable angle and the outer end of the opening 17 is tapered in a similar manner, as shown at 22. Therefore, when the screw is in position these two tapered surfaces will properly center the screw in the head.

The screw is held against movement in the opposite direction in the opening 17 by a transverse pin 23 passing through a transverse opening 24 in the screw, and when the screw is in position this opening and the pin is in the counterbore 18, the pin being of a length substantially equal to or somewhat less than the diameter of the counterbore. The parts are assembled by first inserting the screw in the opening 17. Then the pin 23 is inserted in the opening 24 by passing it into this opening from one of the openings 13 for the guide rods and through the break 19 between the counterbore and this opening. The opening 13, therefore, provides the required space to permit the insertion of the pin 23. After the pin is in position the guide rods 12 are then forced into the opening 13 and are secured therein by the tight fit. It will be apparent that as soon as the rods 12 are forced into these openings each will close the break or communication 19 between its opening 13 and the counterbore, and therefore, the pin 23 cannot drop out of the screw because it is held by the walls of the counterbore and the portion of the rods 12 at the breaks 19. It is, therefor, unnecessary to perform any operations on this pin to secure it in position, the mere operation of assembling the elements of the device forming a construction which prevents its dropping out. As the pin is enclosed within the counterbore it is entirely out of the way and will effectively cooperate with the shoulder 20 to retain the screw in proper position in the movable jaw. It will be obvious that this is a very effective means for securing the screw in the jaw and does not appreciably weaken the screw as would the common method of securing it which involves a groove cut in the surface of the screw for cooperation with a set screw.

Having thus set forth the nature of my invention, what I claim is:

1. In a vise, stationary and movable jaws, a guide rod secured to one jaw and guided in an opening in the other jaw, an adjusting screw, said movable jaw having an opening therethrough for said screw and counterbored at one end, which counterbore is of a size to break through the adjacent wall of the opening for the guide rod, said screw having a transverse hole in said counterbore, and a retaining pin inserted in the opening in the screw from the opening for the rod before the rod is inserted therein and held in the screw by said rods and the walls of the counterbore.

2. In a vise, stationary and movable jaws, said movable jaw having an opening therethrough counterbored at its inner end, said jaw being also provided with an opening at one side of the first opening for a guide rod, an adjusting screw in the first opening having a head at the outer side of the jaw and also having a transverse opening in the counterbore, said counterbore being of a size to overlap somewhat the opening for the guide rod so as to communicate therewith, and a retaining pin in the transverse opening in the screw and capable of insertion from the opening for the guide rod before said rod is inserted in its opening.

3. In a vise, a stationary and movable jaw, said movable jaw having a transverse opening counterbored at its inner end, said movable jaw being also provided with openings at opposite sides of the first opening and spaced therefrom, said counterbore being of a size to overlap a portion of at least one of said latter openings so as to form a communication therewith, guide rods secured in the second openings and guided for sliding movements in the stationary jaw, an adjusting screw in the first opening and having threaded engagement with the stationary jaw, said screw being provided with a shoulder at the outer end of the first opening and having a transverse opening in the counterbore, and a retaining pin in said latter opening capable of insertion from one of the openings for the guide rod before the rod is inserted therein.

In testimony whereof I affix my signature.

FREDERICK BRINK.